Nov. 17, 1970   HIDEHARU MOTOYASU ET AL   3,541,506
AUTOMOTIVE VEHICLE SIGNALING SYSTEM
Filed May 22, 1968                             2 Sheets-Sheet 1

INVENTORS
HIDEHARU MOTOYASU
HISASHI YONEZU
BY

United States Patent Office 3,541,506
Patented Nov. 17, 1970

3,541,506
AUTOMOTIVE VEHICLE SIGNALING SYSTEM
Hideharu Motoyasu and Hisashi Yonezu, Aichi-ken, Japan, assignors to Nippon Denso Co., Ltd., Kariya-shi, Aichi-ken, Japan
Filed May 22, 1968, Ser. No. 731,148
Claims priority, application Japan, May 29, 1967, 42/34,085
Int. Cl. B60q 1/26
U.S. Cl. 340—80　　　　　　　　　　　　　　5 Claims

ABSTRACT OF THE DISCLOSURE

A set of signal lamps provided on opposite sides of a vehicle body are flashed for different durations in a cycling manner for turn signalling. For this purpose, a plurality of time relays are so arranged that the operation of one time relay is relayed to the following time relay after a delay time. A pilot lamp, which is flashed simultaneously with the signal lamps in turn signalling, remains illuminated upon burn-out of any one of the signal lamps.

The circuit is so arranged that all the signal lamps on both sides of the vehicle body may blink on and off in emergency stop signalling.

BACKGROUND OF THE INVENTION

The present invention relates to signal systems for vehicles, and more particularly to a combination turn and emergency stop signal apparatus.

In one system of this type, a set of signal lamps is provided on each side of the rear of the vehicle. To signal a left turn, the signal lamps on the left side of the vehicle are flashed successively in one direction. Similarly, a right turn is signalled by flashing the signal lamps on the right side of the vehicle. This has the advantage that turns signals may easily be discriminated from brake signals, and that the turn direction of the vehicle may clearly be indicated for the driver of following vehicle, since the light of the signal lamps may be perceived just as it moves continuously in a selected direction.

In a usual arrangement, a plurality of cam plates of different profile are driven by an electric motor in the vehicle, and actuate successively switches inserted in energizing circuits of signal lamps. However, such an arrangement does not function to indicate the burn-out of any one of the signal lamps. To indicate the burn-out of the signal lamps, arrangement would be very complicated in structure, because many current relays would be required for detecting lamp current.

In another arrangement, a plurality of hot wire relays having different times of expansion of hot wires are used for flashing signal lamps in succession. This arrangement has the disadvantage that the duration of flashing will fluctuate in the course of time, because of variation in the time of expansion of the hot wires due to their aging, so that either the duration or the frequency of flashing will be inaccurate.

In modern signal systems, it is desired that all signal lamps, when a vehicular traffic hazard occurs, are flashed simultaneously to signal an emergency stop. Neither of the arrangements described above, however, can meet this requirement.

SUMMARY OF THE INVENTION

An object of the present invention is to provide a new and improved signal system of simplified structure.

Another object of the present invention is to provide a new and improved signal system capable of indicating the burn-out of any one of the signal lamps.

A further object of the present invention is to provide a new and improved signal system in which the duration as well as the frequency of flashing may be kept accurate.

A still further object of the present invention is to provide a new and improved signal system capable of signalling an emergency stop.

Further objects and advantages of the present invention will be apparent from the following description, taken with the accompanying drawings.

BRIEF DESCRIPTION OF THE DRAWINGS

In the drawings.

In the figures throughout corresponding parts are designated with similar reference characters.

DESCRIPTION OF THE PREFERRED EMBODIMENTS

Figure 1:
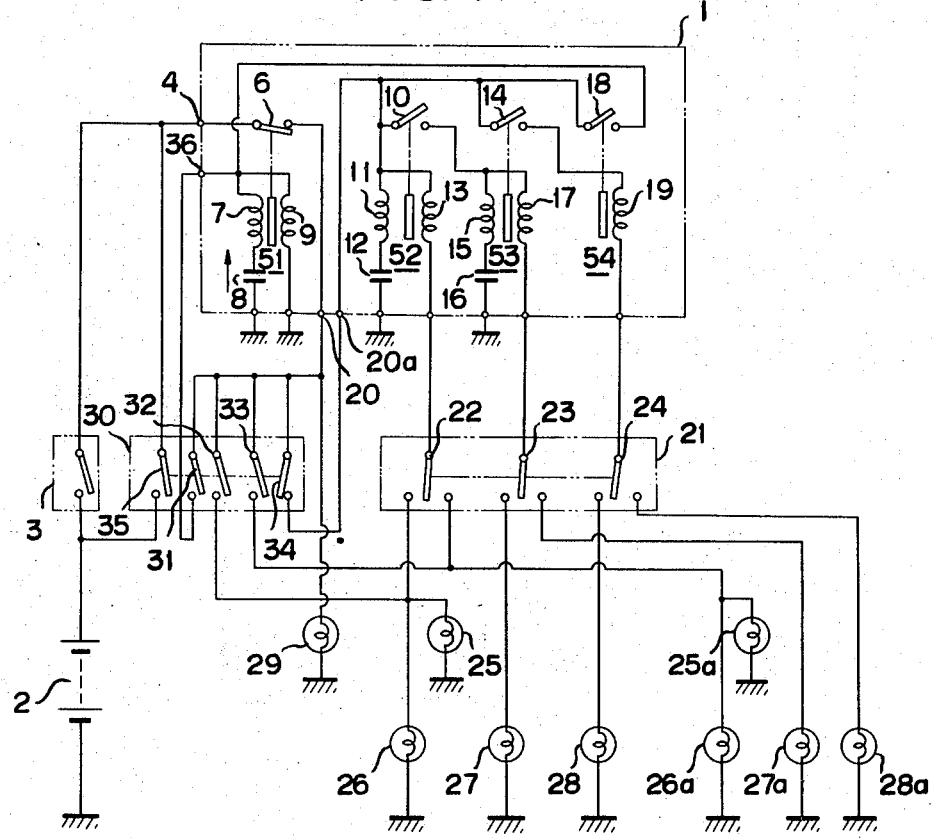
FIG. 1 is a connection diagram of a circuit arrangement for generating selectively turn signals or emergency stop signals.

Referring now to FIG. 1, 1 designates a flasher unit which is connected with its input terminal 4 to the positive pole of an electric power source 2, such as a battery having its opposite terminal grounded, through a main switch 3. A first time relay 51 has two exciting coils 7 and 9 wound in opposite senses relative to each other on a common iron core.

The coil 7, in series with a condenser 8, and the coil 9 are connected in parallel between a second input terminal 36 and ground. A normally closed contact 6 belongs to the first time relay 51. A second time relay 52 has two exciting coils 11 and 13, wound in opposite senses relative to each other on a common iron core and having first ends connected in parallel to a terminal 20a, and a normally open contact 10. The other end of coil 11 is grounded through a condenser 12. The other end of the coil 13 is connected selectively to a front left signal lamp 25 and a first rear left signal lamp 26, or to a front right signal lamp 25a and a first rear right signal lamp 26a, through a first movable contact 22 of a triple-pole double-throw switch 21 for turn signalling. The resistance of the coil 13 is designed so low that the signal lamps 25, 26 or 25a, 26a may be illuminated brightly enough. A third time relay 53 has two exciting coils 15, 17, a condenser 16 and a normally open contact 14, similar in their arrangement and connection to those parts 11, 13, 12 and 10 of the second time relay 52. The lower end of the coil 17 is connected selectively to a second rear left signal lamp 27 or to a second rear right signal lamp 27a, through a second movable contact 23 of the switch 21. A fourth relay 54 has a coil 19 and a normally open contact 18. The lower end of the coil 19 is connected selectively to a third rear left signal lamp 28 or to a third rear right signal lamp 28a, through a third movable contact 24 of the switch 21. First ends of the normally open contacts 10, 14 and 18, and the junction of the coils 11 and 13, are connected commonly to the input terminal 4 through a normally closed contact 34 of a five-pole single-throw switch 30, for hazard warning, and the normally closed contact 6. The other ends of the normally open contacts 10, 14 and 18 are connected to the junction of the coils 15 and 17, the coil 19, and the junction of the coils 7 and 9, respectively. The delay time of each relay 51, 52 or 53 is determined by the time constant of the exciting part of the relay. Thus, the third time relay 53 is energized upon closing of the contact 10 of the second time relay 52 due to the current flowing to the first signal lamp 26 or 26a through the coil 13, while the fourth relay 54 is energized upon closing of the contact 14 of the third time relay 53 due to the current flowing to the second signal lamp 27 or 27a through the coil 17. Similarly, the first time relay 51 is energized upon closing of the contact 18 of the fourth relay 54 due to the current flowing to the third signal lamp 28 or 28a through the coil 19.

Figure 3:
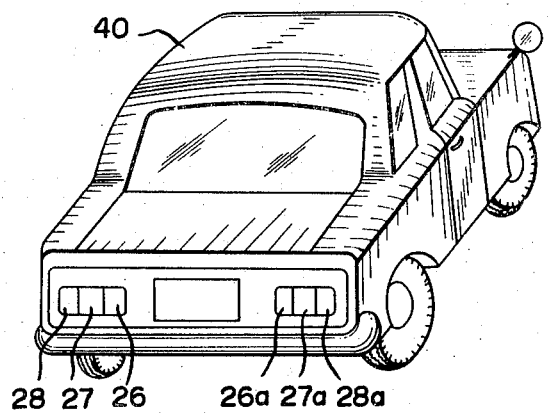
FIG. 3 is a perspective view of a vehicle body having signal lamps provided on the rear thereof.

The signal lamps 26, 27, 28, and 26a, 27a, 28a are provided on the rear of a vehicle body 40, as shown in FIG. 3. A set of rear left signal lamps 26, 27, 28 are arranged in succession outwardly on the left side, while a set of rear right signal lamps 26a, 27a, 28a are arranged in succession outwardly on the right side. A pilot lamp 29, visible to the driver, may be connected to the junction of the contacts 6 and 34. The other terminals of all the lamps 25, 25a, 26, 26a, 27, 27a, 28, 28a and 29, together with the negative pole of the power source 2, are grounded. The switch 30 for hazard warning has a normally open contact 31 for connecting the junction of the coils 7 and 9 to the input terminal 4 through the contact 6, a normally open contact 32 for connecting the signal lamps 25 and 26 to the input terminal 4 through the contact 6, a normally open contact 33 for connecting the signal lamps 25a and 26a to the input terminal 4 through the contact 6, and a normally open contact 35 connected in parallel with the main switch 3.

Figure 4:
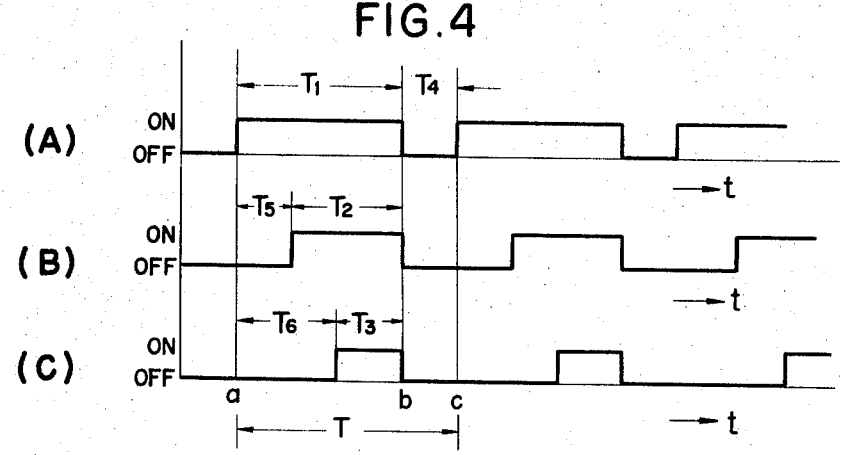
FIG. 4 is a set of curves graphically illustrating the operation of the turn signals.

The operation of the above circuit arrangement will now be described. Upon starting of the vehicle, the main switch 3 is closed. To signal a left turn, the triple-pole double-throw switch 21 for turn signalling is thrown to the left. Current from the power source 2 flows to the pilot lamp 29 through the contact 6, and to the left signal lamps 26 and 26 through the contact 6, the contact 34, the coil 13 of the second time relay 52 and the then closed contact 22, whereby the lamps 25, 26 and 29 will be flashed at the moment $a$ in FIG. 4. At the same time, charging current from the power source 2 flows to the condenser 12 through the coil 11. The magnetic flux of the coil 11 and that of the coil 13 at first cancel each other so that the contact 10 remains open for a while. In the course of charging of the condenser 12, the exciting current bowing through the coil 11 gradually decreases, and when the difference in magnetic bux between the coils 13 and 11 exceeds a predetermined value, the contact 10 will be brought into its closed position. Upon closing of the contact 10, the second signal lamp 27 is supplied with current through the coil 17 of the third time relay 53 and the then closed contact 23, and is flashed a predetermined delay time $T_5$ (FIG. 4) after the first signal lamp 26 has been energized. At the same time, the condenser 16 is charged through the coil 15. The contact 14 is brought into its closed position in a manner similar to the contact 10. Upon closing the contact 14, the third signal lamp 28 is energized through the coil 19 of the fourth relay 54 and the then closed contact 24, and is flashed a predetermined delay time $T_6$ (FIG. 4) after the first signal lamp 26 has been energized. The relay 54 closes the contact 18 without delay, so that the first time relay 51 is excited simultaneously with the relay 54. The contact 6 remains closed, until the difference in current between the coils 9 and 7 exceeds a predetermined value, so that the lamps 26, 27 and 28 remain illuminated. At the moment $b$ in FIG. 4, when the above predetermined value has been exceeded, the contact 6 is brought into its open position, and all the lamps 25, 26, 27, 28 and 29 hitherto illuminated are disconnected from the power source 2. Upon opening of the contact 6, the condenser 8 begins to discharge through the coils 7 and 9 in the direction shown with an arrow. The magnetic flux in the coil 7 and that in the coil 9 cooperate with each other to keep the contact 6 still open. When the discharging current decreases below a predetermined value, the contact 6 is brought into its closed position by means of a spring (not shown). The duration of opening of the contact 6 is represented with $T_4$ in FIG. 4. At the moment $C$ when the contact 6 has returned to its original position, the above operation begins again, and will be repeated as long as the switch 21 is thrown to the left. Thus, the signal lamps 26, 27 and 28 are flashed in succession for the durations $T_1$, $T_2$, $T_3$, respectively, with the period $T$, and may be perceived by the driver of the following vehicle as light flowing to the left along the signal lamps 26, 27 and 28. Similarly, a right turn is signalled by flashing the right signal lamps 26a, 27a, 28a upon throwing of the switch 21 to the right.

The normally open contacts 10, 14 or 18 are brought into closed position by the current flowing to the signal lamps 25, 26 (or 25a, 26a), 27 (or 27a), or 28 (or 28a) through the coil 13, 17 or 19. Therefore, in case any one of those signal lamps is burnt out, the relay 51 is no longer energized from the power source 2, so that the contact 6 remains closed. The pilot lamp 29, energized through the then closed contact 6, remains illuminated, and warns the driver of the burnout of a signal lamp.

To signal an emergency stop, the five-pole single-throw switch 30 is thrown in. Then the normally open contacts 31, 32, 33 and 35 are closed, respectively, while the normally closed contact 34 is opened. The signal lamps 25, 26 and 25a, 26a on both sides of the vehicle are now connected to the power source 2 through the respective then closed contact 32 or 33, while the circuits to the switch 21 are broken by the then open contact 34. The relay 51 is supplied with current from the power source 2 through the then closed contact 31. The signal lamps 25, 26, 25a, 26a, and the pilot lamp 29 remain illuminated, until the contact 6 is brought into its open position due to diminishing of the charging current for the condenser 8. Upon opening of the contact 6, those lamps are de-energized, and remain turned out until the contact 6 returns to its closed position in the manner described above, so that the above operation begins again. Thus the signal lamps 25, 26, 25a, 26a repeatedly blink on and off thereby signalling the emergency stop.

Since the exciting current of the relay 51 is independent of the lamp current, an emergency stop, in spite of burn-out of any one or more of the signal lamps 25, 26, 25a and 26a, may be signalled. The signal lamps 27, 27a, 28, 28a also may be used for signalling the emergency stop by increasing the number of poles of the switch 30.

Figure 2:
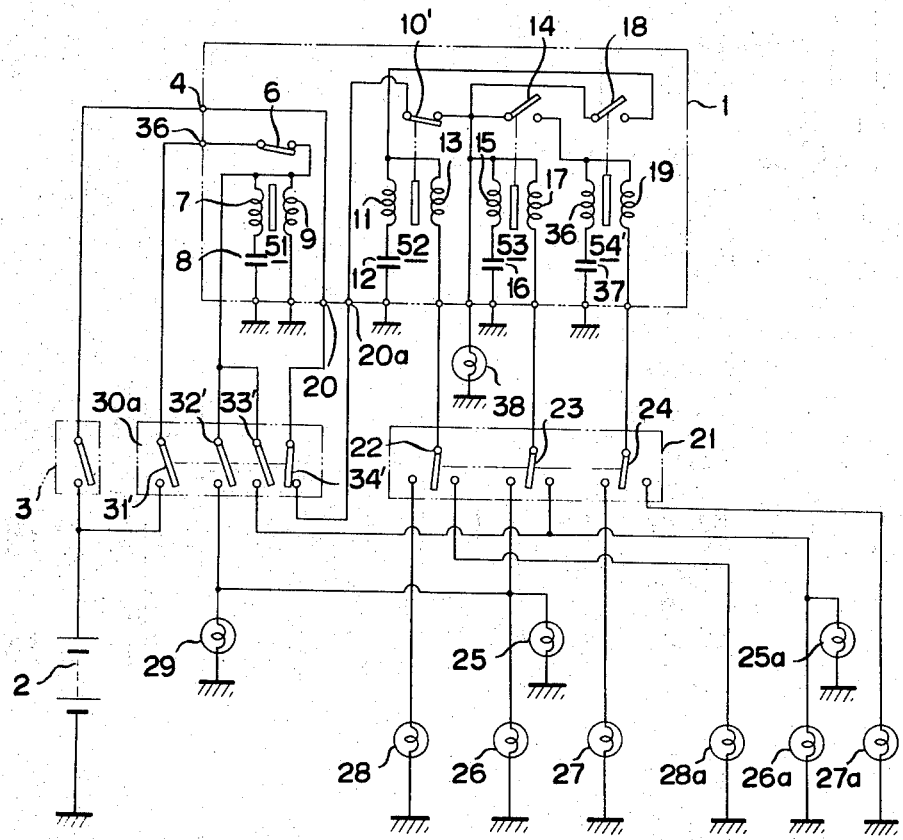
FIG. 2 is a connection diagram similar to FIG. 1, but illustrating a modified construction.

In another embodiment shown in FIG. 2, the second time relay 52 has a normally closed contact 10' instead of the normally open contact 10 in FIG. 1. A relay 54', corresponding to the relay 54, has another coil 36 and a condenser 37 in series with each other. The upper end of the coil 36 is connected to the upper end of the coil 19. The junction of the contacts 14 and 18, together with the junction of the coils 15 and 17, is connected to the input terminal 4 through the normally closed contact 10' and the normally closed contact 34' of a four-pole single-throw switch 30a for an emergency stop. The other end of the contact 18 is connected to the junction of the coils 11 and 13. The junction of the coils 7 and 9 is connected to the positive pole of the power source 2 through the contact 6 and a normally open contact 31' of the switch 30a, and also to the junction point of normally open contacts 32' and 33' of the switch 30a. The coil 13 is connected selectively to the signal lamp 28 or 28a through the movable contact 22, the coil 17 to the signal lamps 25, 26 or 25a, 26a through the movable contact 23, and the coil 19 to the signal lamp 27 or 27a, respectively. A pilot lamp 38 for turn signalling is connected in parallel with the series circuit of the coil 15 and the condenser 16. Further, the pilot lamp 29 is connected in parallel with the signal lamp 25.

The circuit arrangement in FIG. 2 operates in a manner similar to that in FIG. 1. The normally closed contact 10' of the second time relay 52, instead of the contact 6 in FIG. 1, has a function of turning off the signal lamps in the continuous flashing operation. In this case, the relay 52 has the function similar to the relay 51 in FIG. 1, and the relay 51 in this embodiment operates for signalling an emergency stop. The pilot lamp 38 is used for turn signalling, while the pilot lamp 29 warns of an emergency stop.

What is claimed is:

1. Signal apparatus for vehicles comprising, in combination, a source of potential; sets of signal lamps on each side of at least the rear end of the vehicle, each lamp having one terminal connected to a first terminal of said source; plural lamp controlling relays each having an exciting winding, and including serially energized relays; at least certain of said lamp controlling relays having time delay means including a condenser whose charge and discharge times control the delay time of the associated timing relay; turn signal selector switch means having an open position and selectively operable to connect the other terminals of the lamps of a selected set to the exciting windings of respective relays; one of said lamp controlling relays including a first normally closed contact connected to the other terminal of said source and included in series in a first lamp energizing circuit including said serially energized relays and said turn signal selector switch means; a pilot lamp connected across said source through said first normally closed contact; circuit means, including the excting winding of said relay having said first normally closed contact, operable, responsive to flow of lamp energizing current through the exciting winding of each relay of said serially energized relays to energize the next succeeding relay of said serially energized relays, and operable, responsive to energization of all lamps of the selected set, to open said first normally closed contact and then to reclose said first normally closed contact to restart the cycle of lamp energization; said relay having said first normally closed contact, upon failure of any lamp in said selected set, being insufficiently energized to open said first normally closed contact, resulting in interruption of the lamp energizing cycle and steady energizing of said pilot lamp; and selectively operable hazard warning switch means including a second normally closed contact connected in series with said first normally closed contact in said first lamp energizing circuit between said source and said turn signal selector switch means, and including normally open contact means connecting the exciting winding of one of said certain relays and a normally closed contact of the latter relay in series with each other in a second lamp energizing circuit including, in parallel, at least one lamp of each set.

2. Signal apparatus for vehicles, as claimed in claim 1, including a main switch connected in series between said other terminal of said source and said first normally closed contact; said hazard warning switch means including a normally open contact connected in parallel with said main switch.

3. Signal apparatus for vehicles as claimed in claim 1, in which some of said certain lamp controlling relays are differential relays each including a pair of exciting windings wound in opposite sense on the same core and having first ends connected to each other; the second end of one exciting winding of each of said some relays being connected to said turn signal selector switch means, and the second end of the other exciting winding of each of said some relays being connected through the associated condenser to said first terminal of said source.

4. Signal apparatus for vehicles as claimed in claim 3, in which said relay having said first normally closed contact is also a differential relay having a pair of opposed exciting windings, one of which is in series with an associated condenser; the serially energized relay controlling the energization of said relay having said first normally closed contact being an instantaneous pick-up relay having a single exciting winding.

5. Signal apparatus for vehicles, as claimed in claim 1, in which each of the relays connected to said turn signal selector switch means is a differential relay, and one of said last named differential relays is constituted by said relay having said first normally closed contact; the relay including the normally closed contact connected to said second energizing circuit in series with said normally open contact means of said hazard warning switch means also being a differential relay.

References Cited

UNITED STATES PATENTS

| | | | |
|---|---|---|---|
| 2,912,675 | 11/1959 | Habsburg-Lothringen et al. | 340—82 X |
| 3,225,343 | 12/1965 | Kratochvil | 340—82 X |
| 3,274,441 | 9/1966 | Benedik | 340—342 X |

FOREIGN PATENTS

| | | |
|---|---|---|
| 816,010 | 7/1959 | Great Britain. |

ALVIN H. WARING, Primary Examiner

K. N. LEIMER, Assistant Examiner

U.S. Cl. X.R.

340—82, 251